UNITED STATES PATENT OFFICE.

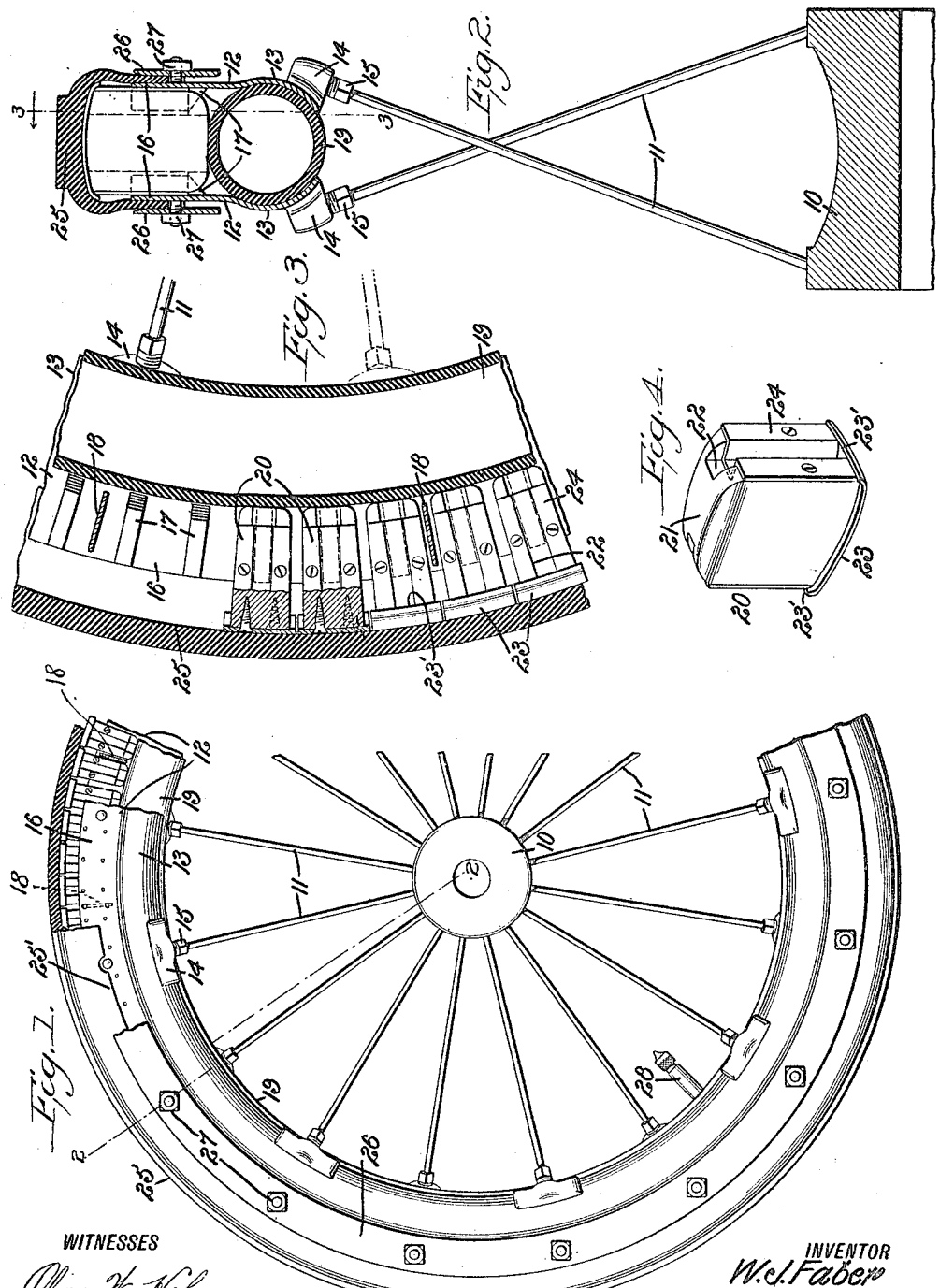

WILLIAM J. FABER, OF ONEIDA, NEW YORK, ASSIGNOR OF ONE-HALF TO CHRISTIAN C. FABER, OF BROOKLYN, NEW YORK.

RESILIENT WHEEL.

1,231,343.　　　　　Specification of Letters Patent.　　Patented June 26, 1917.

Application filed July 21, 1916. Serial No. 110,471.

*To all whom it may concern:*

Be it known that I, WILLIAM J. FABER, a citizen of the United States, and a resident of Oneida, in the county of Madison and State of New York, have invented a new and Improved Resilient Wheel, of which the following is a full, clear, and exact description.

This invention relates to resilient tires and wheels and has particular reference to improved facilities for mounting a pneumatic cushion or tire within instead of outside of the rim, whereby the pneumatic cushion is effectively protected both on the tread and on the sides from cuts, punctures or wear.

Among the objects of the invention is to provide therefore a wheel having a tread and rim portion including lateral shell parts constituting a rigid rim or the equivalent of a rim, said shell parts being adapted to house within or between them, a pneumatic tire or cushion of a resilient nature, against the outer portion of which a circular series of tread blocks are adapted to operate radially.

A further object of the invention is to provide in combination with the lateral shell parts, a series of radially and independently movable tread blocks for tongue and groove connection with the inner faces of the shell parts, and a flexible jacket or shoe extending over the outer ends of all of said blocks and having its side edges clamped to the said shell parts.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a side elevation of the principal parts of a wheel embodying my improvement;

Fig. 2 is a transverse section on the line 2—2 of Fig. 1, the view being on a larger scale;

Fig. 3 is a vertical sectional view on the line 3—3 of Fig. 2; and

Fig. 4 is a perspective detail of one of the aforesaid tread blocks, showing its form and manner of construction.

Referring now more particularly to the drawings, I show a wheel having any suitable form of hub 10 and spokes 11, to the outer ends of which spokes is secured my improved resilient rim structure.

Said rim is composed of two similar parallel side shell parts 12 constituting the equivalent of the ordinary rigid rim of a wheel. The inner edge portions of these shells are formed partially tubular or rounded in cross section, as shown at 13, and these portions of the shell parts on their outer faces carry a plurality of lugs 14, the lugs being staggered in succession around the wheel. The spokes 11 are connected to these lugs by any suitable binding nuts 15 and preferably adjacent spokes are crossed to increase the rigidity of the wheel, as shown in Fig. 2.

The outer edge portions of the shell parts, as indicated at 16, are flat and spaced laterally from each other. The inner faces of these flat portions are each provided with a circular series of laterally disposed ribs 17. These ribs may be formed integral with the shell parts or otherwise secured rigidly thereto. These ribs, it will be understood, are arranged in complete circular series on both of the shell parts and each rib is arranged directly opposite another similar rib of the other shell part, constituting therewith a pair of ribs.

A series of bracing webs 18 are connected to and extend between the two flat portions 16 of the shell parts. Each of the webs 18 lies midway between adjacent pairs of ribs 17, but the number of the webs is less than the number of pairs of ribs.

The cushion above referred to is indicated at 19 and is in the nature of a single tube pneumatic tire, although it is to be understood that this cushion is not a tire in the sense that it receives the direct contact of the roadway or is otherwise directly exposed to damaging influences or conditions. On the contrary, it is clamped within or between the tubular portions 13 of the shell parts 12. The inner edges of the shell parts are spaced from each other exposing the inner portion of the cushion to view, but the tube has sufficient strength to resist the tendency thereof to bulge out through said space under pressure.

The next important improvement in this device consists of a circular series of tread blocks 20, one of which is shown in detail in Fig. 4. Each of these blocks comprises a body 21 of wood or some other suitable strong material that is not too heavy, provided on each side edge with a channel 22 and on its outer end with a metal cap 23 curved both circumferentially of the wheel and transversely. Each side edge of the block also is faced with a channel plate 24, into which one of the aforesaid ribs 17 is adapted to project and hold the block from circumferential movement independently of the wheel parts, but permitting free radial movement of the block as far as permitted by the other parts of the structure. The inner ends of the blocks are slightly rounded and abut directly against the outer portion of the cushion 19. The outer or cap ends of the blocks bear against the inner face of a flexible shoe 25. This shoe may be made of any suitable tough strong flexible material, having a thick tread to make the direct wearing contact with the roadway and is provided with inwardly projecting side flanges 25' clamped between the outer faces of the shell parts 12, and a pair of flat rings 26 secured in place by means of bolts and nuts 27 projecting outwardly from the shell parts, as shown best in Fig. 2. The rounded form of the caps 23 with their inturned rims 23' insures against danger of cutting of the tread portion of the shoe.

The parts are so designed that when the cushion 19 is inflated in the usual manner through the nipple 28, the blocks are all projected beyond the outer edges of the shell parts 12 to a distance sufficient to provide inward radial movement of that portion of the tread of the wheel in proportion to the load applied thereto. In other words, when an obstruction is encountered, the tread portion of the shoe and the blocks directly within the same meeting such obstruction, will be forced radially inwardly against the cushion, the air pressure within the cushion resisting such movement resiliently like the action of an ordinary pneumatic tire, but without any of its dangers or disadvantages, due to the fact that the resilient tire or cushion is so thoroughly protected from the roadway or other dangerous conditions.

When the resilient shoe 25 becomes worn, as it will after continued use, another may be substituted therefor by loosening the nuts 27, all the other portions of the wheel being practically indestructible. If, however, after a number of years, the pneumatic cushions 19 become deteriorated, others may be substituted therefor with a minimum amount of trouble. By unscrewing spokes on one side the pneumatic cushion 19 may be removed directly through the space between the shell parts 13, the other spokes holding the other wheel parts in place.

I claim:

In a resilient wheel, the combination of a pair of spaced parallel rigid shell parts, the inner edge portions of which are of partially tubular form, while the outer edge portions of which are flat, there being left between the inner edges of the tubular portions a continuous circumferential free space, a resilient cushion carried within and between said partially tubular portions of the shell parts and projecting inwardly into and through said free space, a tread shoe secured to the shell parts, and a circular series of independently movable radial blocks filling the space between the shoe and the outer portion of the cushion, substantially as set forth.

WILLIAM J. FABER.

Copies of this patent may be obtained for five cents each, by addressing the "Commissioner of Patents, Washington, D. C."